(12) United States Patent
Roberts et al.

(10) Patent No.: US 11,151,579 B2
(45) Date of Patent: Oct. 19, 2021

(54) AUTHENTICATION OF GOODS

(71) Applicant: MASTERCARD INTERNATIONAL INCORPORATED, Purchase, NY (US)

(72) Inventors: David Anthony Roberts, Warrington (GB); Patrik Smets, Nijlen (BE); Ramin Aghdaee, Waterloo (BE); Joseph Pitcher, Merseyside (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 204 days.

(21) Appl. No.: 16/209,340

(22) Filed: Dec. 4, 2018

(65) Prior Publication Data
US 2019/0188731 A1      Jun. 20, 2019

(30) Foreign Application Priority Data
Dec. 20, 2017   (EP) ..................... 17208880

(51) Int. Cl.
*G06Q 30/00*      (2012.01)
*G06Q 20/40*      (2012.01)
(Continued)

(52) U.S. Cl.
CPC ....... *G06Q 30/0185* (2013.01); *B42D 25/305* (2014.10); *G06Q 20/20* (2013.01);
(Continued)

(58) Field of Classification Search
CPC .. G06Q 30/0185; G06Q 20/20; G06Q 20/209; G06Q 20/341; G06Q 20/352;
(Continued)

(56) References Cited

U.S. PATENT DOCUMENTS 7,870,077 B2    1/2011 Woo et al.
10,489,778 B2 * 11/2019 Mobini ................. G06Q 20/02
(Continued)

FOREIGN PATENT DOCUMENTS

EP    1 710 764 A1   10/2006
GB       2455812 A    6/2009
(Continued)

*Primary Examiner* — Florian M Zeender
*Assistant Examiner* — Milena Racic
(74) *Attorney, Agent, or Firm* — Loza & Loza, LLP

(57) ABSTRACT

A method for a goods manager to authenticate products at the point of sale is provided. The method comprises: providing an authentication device to a merchant, wherein the authentication device is not associated with a product but is configured to receive product information from a merchant terminal; once information about a product has been received by the authentication device from the merchant terminal, obtaining from the authentication device a signed message comprising information about the authentication device and information about the product received from the merchant terminal; and providing authorization data to the authentication device if the information fulfils one or more criteria, thereby associating the authentication device with the product. A method for a merchant to authenticate goods at the point of sale and a merchant terminal to perform such a method are also provided.

20 Claims, 5 Drawing Sheets

(51) Int. Cl.
*G06Q 20/34* (2012.01)
*G07G 1/00* (2006.01)
*G06Q 20/20* (2012.01)
*G06Q 20/38* (2012.01)
*B42D 25/305* (2014.01)

(52) U.S. Cl.
CPC ......... *G06Q 20/209* (2013.01); *G06Q 20/341* (2013.01); *G06Q 20/352* (2013.01); *G06Q 20/3552* (2013.01); *G06Q 20/3825* (2013.01); *G06Q 20/3827* (2013.01); *G06Q 20/401* (2013.01); *G06Q 30/018* (2013.01); *G07G 1/009* (2013.01)

(58) Field of Classification Search
CPC ........... G06Q 20/3552; G06Q 20/3825; G06Q 20/3827; G06Q 20/401; G06Q 30/018; B42D 25/305; G07G 1/009
See application file for complete search history.

(56) References Cited

U.S. PATENT DOCUMENTS

| | | | |
|---|---|---|---|
| 2002/0091573 A1* | 7/2002 | Hodes | B65D 5/422 705/17 |
| 2002/0147907 A1 | 10/2002 | Ross | |
| 2003/0145205 A1 | 7/2003 | Sarcanin | |
| 2006/0235805 A1 | 10/2006 | Peng et al. | |
| 2008/0120119 A1 | 5/2008 | Lee | |
| 2008/0301056 A1 | 12/2008 | Weller et al. | |
| 2010/0252624 A1 | 10/2010 | Van de Velde et al. | |
| 2014/0108174 A1 | 4/2014 | Bernheim | |
| 2014/0258108 A1* | 9/2014 | Ekselius | G06Q 20/3227 705/41 |
| 2014/0282974 A1 | 9/2014 | Maher et al. | |
| 2015/0066777 A1 | 3/2015 | Bateson | |
| 2015/0199689 A1 | 7/2015 | Kumnick et al. | |
| 2015/0254677 A1 | 9/2015 | Huxham et al. | |
| 2016/0098730 A1* | 4/2016 | Feeney | G06Q 20/3825 705/71 |
| 2016/0132704 A1 | 5/2016 | Engels et al. | |
| 2016/0358185 A1 | 12/2016 | Zhang | |
| 2017/0178121 A1* | 6/2017 | Roberts | G06Q 20/3676 |
| 2019/0043059 A1* | 2/2019 | Xie | G06Q 20/40 |
| 2019/0188730 A1 | 6/2019 | Smets et al. | |

FOREIGN PATENT DOCUMENTS

| | | |
|---|---|---|
| GB | 2525191 A | 10/2015 |
| WO | WO 2017/116303 | 7/2017 |

\* cited by examiner

AUTHENTICATION OF GOODS

CROSS-REFERENCE TO RELATED APPLICATION

This application claims the benefit of and priority to European Patent Application No. 17208880.9, filed Dec. 20, 2017. The entire disclosure of the above application is incorporated herein by reference.

FIELD

This present disclosure relates generally to the management and authentication of goods, and in particular embodiments relating to a method and system to authenticate goods at the point of sale.

BACKGROUND

This section provides background information related to the present disclosure which is not necessarily prior art.

In the luxury goods industry, the value of a good is frequently associated with the origin of the good. Currently, authentication of a good is normally done using a certificate that is provided with the product and stamped or signed by the merchant to certify the particular instance of the good and the location and date of purchase. This certificate may also trigger the start of a warranty associated with the product. This solution has many disadvantages. Firstly, such a document can easily be forged. Secondly, it is difficult for a person subsequently acquiring the goods to verify the authenticity of the goods. Further, such certificates have to either be associated with the good at the point of manufacture, or are filled in by the merchant at the point of sale, which may be error prone. Additionally, although the merchant can keep a record of the instance of product and associated transaction details, and this information can be provided back to the manufacturer and/or distributor, this is not a systematic operation. Therefore, the goods manufacturer/distributor frequently misses out on the opportunity to track the goods that are sold and the location at which they are sold.

Document US 2014/0108174 A1 provides a method of geographically identifying the location of a sale and tracking the sale of a good, wherein the method reuses elements of a bank payment network. However, this method presents a series of disadvantages. For example, the method relies on providing an authentication medium (e.g., a warranty document, card, product packaging itself, etc.) together with the product, to the merchant. The authentication medium comprises a unique identification number that is associated with the product reference. Therefore, the identity of the product is linked to a separate identifier before being provided to the merchant. This results in a complex system where products are inflexibly associated with a single authentication medium before reaching the point of sale.

Therefore, it would be desirable to provide a flexible system for authentication of goods that is simple to use, reliable, and with a minimum overhead on the merchant and any other party to the purchase.

SUMMARY

This section provides a general summary of the disclosure, and is not a comprehensive disclosure of its full scope or all of its features. Aspects and embodiments of the disclosure are set out in the accompanying claims.

According to a first aspect, there is provided a method for a goods manager to authenticate products at the point of sale, the method comprising: providing an authentication device to a merchant, wherein the authentication device is not associated with a product but is configured to receive product information from a merchant terminal; once information about a product has been received by the authentication device from the merchant terminal, obtaining from the authentication device a signed message which comprises information about the authentication device and information about the product received from the terminal; and providing authorization data to the authentication device if the information fulfils one or more criteria, thereby associating the authentication device with the product.

In embodiments, the authentication device is a modified payment card, chip or virtual card provided by an application executed on a computing device. In such embodiments, the authentication device and the goods manager may communicate via at least one element of a transaction infrastructure. Optionally, the at least one element of a transaction infrastructure may comprise the merchant terminal.

In some embodiments, the information about the product is communicated to the authentication device by the merchant terminal.

In embodiments, the signed information communicated from the authentication device is obtained via the merchant terminal.

In embodiments, the merchant terminal is a terminal of a payment system configured to process transactions according to the EMV specification. Optionally, the signed information from the authentication device may comprise an application cryptogram.

In embodiments, the authentication device requests product information as part of the card data object list 1 (CDOL1).

In some embodiments, the product information is stored on the authentication device in the "Amount, authorized", "Amount, other" issuer application data, "Transaction Date", "Transaction Currency Code", or any other data fields used to compute the application cryptogram in a conventional EMV payment device.

In some embodiments, the authentication device stores a personal account number (PAN) and this is used to identify the merchant.

The authentication device may be provided to the merchant via a card issuer, and the card issuer may query the goods manager to verify the product information, and provide the authorization data to the authorization device.

In embodiments, the authorization data comprises an authorization code.

In some embodiments, the signed data from the authentication device is communicated to a card issuer, and the card issuer uses the data to generate a unique transaction identifier. Optionally, the transaction identifier may comprise an output of a hash function, and the input of the hash function may comprise an application cryptogram generated by the authentication device. The merchant terminal may optionally provide product and transaction information to a receipt service, and the transaction identifier may be used by the authentication device or a user computing device interacting with the authentication device to obtain the receipt.

In embodiments, the signed information from the authentication device additionally comprises information about the merchant and/or the transaction.

In some embodiments, the authentication device is associated with a unique identifier which is comprised in the signed information.

In embodiments, the product information identifies an instance of the product, and the one or more criteria comprises verifying that the product is not already associated with an authentication device.

Optionally, the method may further comprise recording the unique identifier of the authentication device as associated with the product.

According to a second aspect, there is provided a method for a merchant to authenticate goods at the point of sale, the method comprising: entering product information at a merchant terminal and communicating the product information to an authentication device via the merchant terminal, wherein the authentication device is not associated with a product but is configured to communicate with a merchant terminal to receive product information from the merchant terminal and to store the product information obtained from the merchant terminal; obtaining from the authentication device a signed message comprising information about the authentication device and information about the product received by the authentication device from the merchant terminal; sending the signed information to a card issuer and receiving authorization data from the card issuer if the signed information fulfils one or more criteria; and communicating the authorization to the authentication device.

In embodiments, entering product information at the terminal comprises entering a product identifier at an interface of the terminal, reading a barcode, QR code, or NFC tag.

In embodiments, the authentication device is a chip card, chip or virtual card on a computing device. Communicating with the authentication device may comprise establishing a contact or contactless communication with the card, chip or computing device. Optionally, the merchant terminal may form part of a transaction infrastructure.

In embodiments, the merchant terminal is a terminal of a payment system configured to process transactions according to the EMV specification. Optionally, the terminal may be programmed to execute a standard EMV kernel.

In some embodiments, the signed information from the authentication device may comprise an application cryptogram.

In embodiments, the authentication device requests product information as part of the card data object list 1 (CDOL1).

In some embodiments, the product information is stored on the authentication device in the "Amount, authorized", "Amount, other" issuer application data, "Transaction Date", "Transaction Currency Code", or any other data fields used to compute the application cryptogram in a conventional EMV payment device.

In embodiments, the authentication device stores a personal account number (PAN) and this is used to identify the merchant.

In embodiments, the card issuer provides authorization data if the signed information fulfils one or more criteria, comprises the card issuer querying a goods manager to verify the product information, and provides the authorization data to the authorization device.

In embodiments, the authorization data comprises an authorization code.

In embodiments, the merchant terminal receiving authorization data from the card issuer comprises the terminal receiving a unique transaction identifier generated by the card issuer using the signed data from the authentication device. Optionally, the transaction identifier may comprise an output of a hash function. The input of the hash function may comprise an application cryptogram generated by the authentication device.

In embodiments, the method further comprises the merchant terminal providing product and transaction information to a receipt service. Optionally, the unique transaction identifier generated by the card issuer may be used by the authentication device or a user computing device interacting with the authentication device to obtain the receipt.

Optionally, the signed information from the authentication device may additionally comprise information about the merchant and/or the transaction.

In embodiments, the authentication device is associated with a unique identifier which is comprised in the signed information.

In embodiments, the product information identifies an instance of the product. In such embodiments, signed information fulfilling one or more criteria may comprise the product not being already associated with an authentication device.

According to a third aspect, there is provided a merchant terminal configured to perform the method of the second aspects.

In embodiments, the terminal is part of a payment infrastructure and is configured to perform transactions using the EMV specification.

According to a fourth aspect, there is provided an authentication device configured to obtain and store authenticated product information according to the method of any of the first aspect.

Using this approach, single instances of a product and point of sale information can be tracked and authenticated in a secure and flexible manner. For example, product details can be associated with a transaction and verified by a goods manager in order to generate a proof of authenticity of the goods and optionally trigger the start of a warranty associated with the goods. Additionally, a goods manager can keep track of the sales of individual products in the distribution network. Advantageously, this approach makes use of existing elements of a banking infrastructure and transaction protocols, and does not require prior knowledge of the identity of the goods before they are purchased in order to create an authentication device.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. With that said, embodiments of the present disclosure will now be described, by way of example, with reference to the accompanying Figures, of which:

Corresponding reference numerals indicate corresponding parts throughout the several views of the drawings.

DETAILED DESCRIPTION

Specific embodiments of the present disclosure will be described below with reference to the Figures. The description and specific examples included herein are intended for purposes of illustration only and are not intended to limit the scope of the present disclosure.

The disclosure provides a method of tracking and authenticating goods at the point of sale, wherein the identity of the goods is associated with an authentication device upon sale of the product, and the sale and product information are verified and authenticated by a goods manager. According to the disclosure, elements and protocols of a transaction infrastructure are reused to perform the authentication. In particular, the disclosure may be performed in the context of an EMV transaction system. Advantageously, this allows a flexible and reliable authentication of goods sold by a merchant with a minimum overhead, as well as secure tracking of products sold by a goods provider.

Throughout this document, the words "goods" and "product(s)" are used interchangeably, and derived expressions such as "goods provider" and "products provider", etc., have the same meaning.

EMV is a financial transaction system based around the use of payment devices and contact and contactless transaction cards. In the EMV payment model, an issuing bank provides an account holding customer with a smart card (or other token) to use when making payments. An acquiring bank provides a merchant with a compatible terminal device to use when accepting payments. The term "terminal" here is considered to cover any device that interfaces directly with such a transaction card. Transaction systems using the EMV specification may support offline transactions between a payment card or device and a terminal even when the terminal is not in communication with the main transaction system. Some of the functionalities provided by parties in this system may be reused or provided by different parties performing similar roles in the context of an authentication transaction according to the disclosure, rather than a conventional payment transaction, as detailed below.

Figure 1:
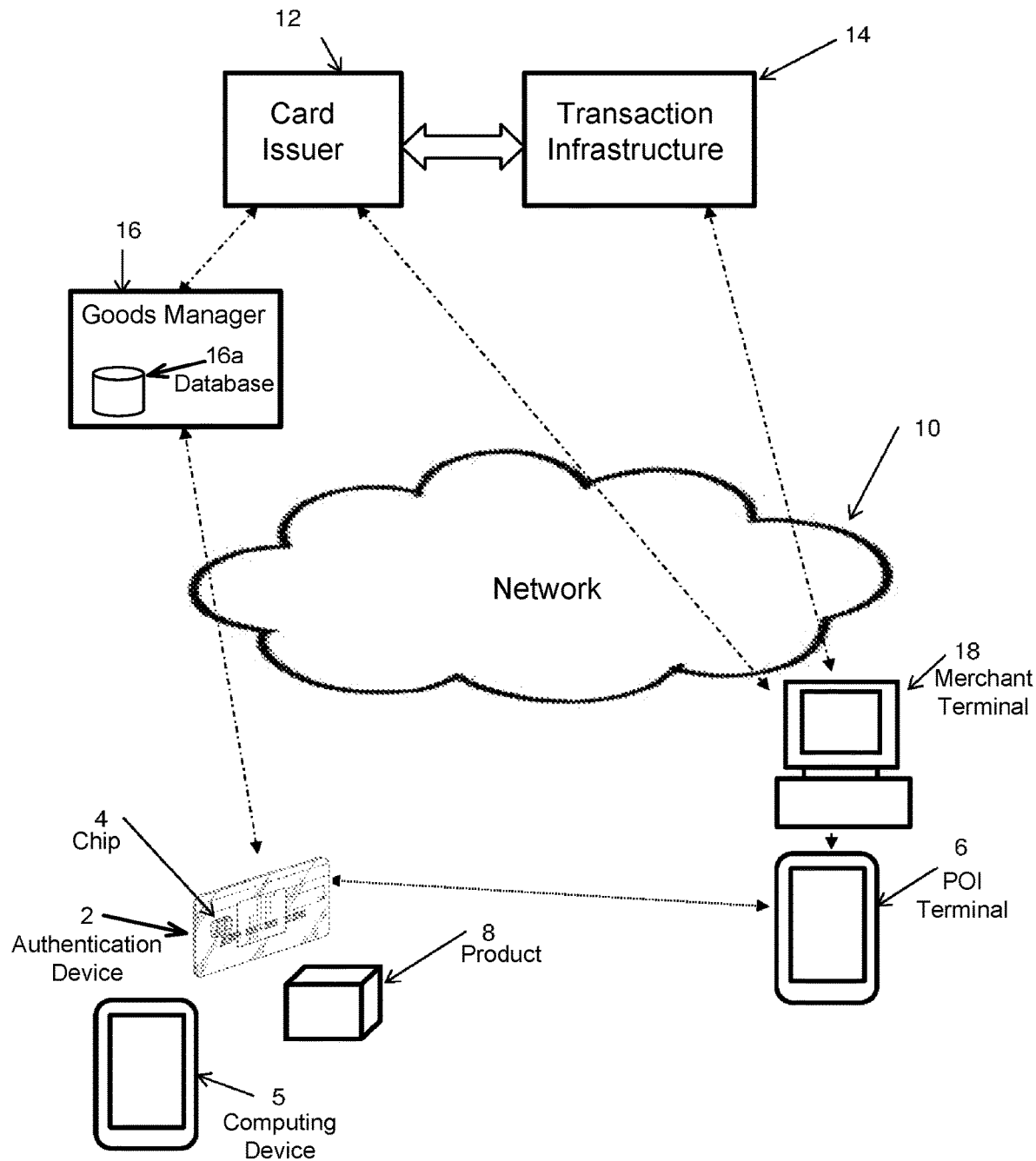
FIG. 1 shows schematically relevant elements of an authentication system in which embodiments of the disclosure may be used.

FIG. 1 shows schematically relevant elements of an authentication system in which embodiments of the disclosure may be used.

A merchant (not shown) is provided with an authentication device 2, in the form of a chip card (as discussed below, in other embodiments other transaction devices may be used). The card 2 comprises a chip 4 with a processor and a memory. The chip 4 is able to contact a terminal 6 to enable contact card protocols, such as those defined under ISO/IEC 7816 to be followed. The card 2 may also comprise an antenna and associated hardware and software to enable communication with a terminal by NFC and associated contactless card protocols, such as those defined under ISO/IEC 14443. When a consumer (not shown) purchases a product 8, the identity of the product 8 and sale information (collectively referred to as "authentication data") are authenticated and communicated to the authentication device 2 via a point of interaction terminal 6. The authentication device 2 is then provided together with the product 8 to the consumer.

In embodiments, the authentication device 2 may be a chip that is embedded in a product. In other embodiments, the authentication device 2 may be a virtual card, the details of which are kept in a dedicated application on a computing device 5. For example, a system similar to that used in the Mastercard® Cloud-based payment solution may be used.

Other computer equipment in the infrastructure may be fixed or mobile, such as the point of interaction (POI) terminal 6, of which the example shown is a point-of sale (POS) terminal used by a merchant interacting with the user. The POS terminal 6 interacts with the authentication device 2 through a card reader (not shown discretely from POS terminal 6), an NFC reader, or a communication network if the authentication device 2 is a virtual card. The merchant POS terminal 6 is connectable to a card issuer 12, either directly or via a merchant terminal 18, preferably in a secure way via a network 10 (either through a dedicated channel or through a secure communication mechanism over a public or insecure channel). In embodiments, a separate goods manager 16 may be provided. The card issuer 12 interacts with the goods manager 16 to exchange product and sale information in order to authenticate a product. In embodiments, a single entity may provide the functionalities of both the card issuer 12 and goods manager 16. The goods manager 16 comprises one or more databases 16a, storing information about previously registered products, merchants, products sold by each merchant, etc. The card issuer 12 provides the authentication devices 2 to the merchant. As the person skilled in the art would understand, the reference to a "card issuer" is used as shorthand for the provider of an authentication device 2, whether the authentication device is physical or virtual, by reference to the simplest case in which this is a chip card.

In embodiments, the functions of the terminal 6 may be performed by a dedicated application on a computing device 5, such as a mobile phone or tablet computer.

A transaction infrastructure 14 connects a terminal 6 or 18 to the card issuer 12, allowing transactions to be carried out between them. This transaction infrastructure 14 may be provided as part of a normal banking infrastructure connecting a payment card issuer and acquiring bank for completing banking transactions. Alternatively, the terminal 6 or 18 may be directly connected with the card issuer 12. The transaction infrastructure 14 and card issuer 12 comprise a plurality of switches, servers and databases, and are not described further here as the details of the transaction infrastructure 14 and card issuer 12 used are not necessary for understanding how embodiments of the disclosure function may be implemented.

In convenient embodiments, the disclosure may work as part of conventional transaction infrastructures as described above. In some embodiments, some of the elements of the conventional infrastructure described above may be omitted and/or some of the above elements may provide some or all of the functionalities of the card issuer, goods manager and transaction infrastructure. In particular, in convenient embodiments, the system may function without the need for a transaction infrastructure. A merchant terminal 18 communicates with the merchant POS terminal 6 and card issuer 12, directly or via the transaction infrastructure 14.

Optionally, an authentication device 2 may be able to communicate with a goods manager 16 (directly or via a card issuer 12) after the sale has been completed, for example, in order to verify information stored on the authentication device 2. This interaction may be mediated through a separate application on a consumer's computing device.

Figure 2:
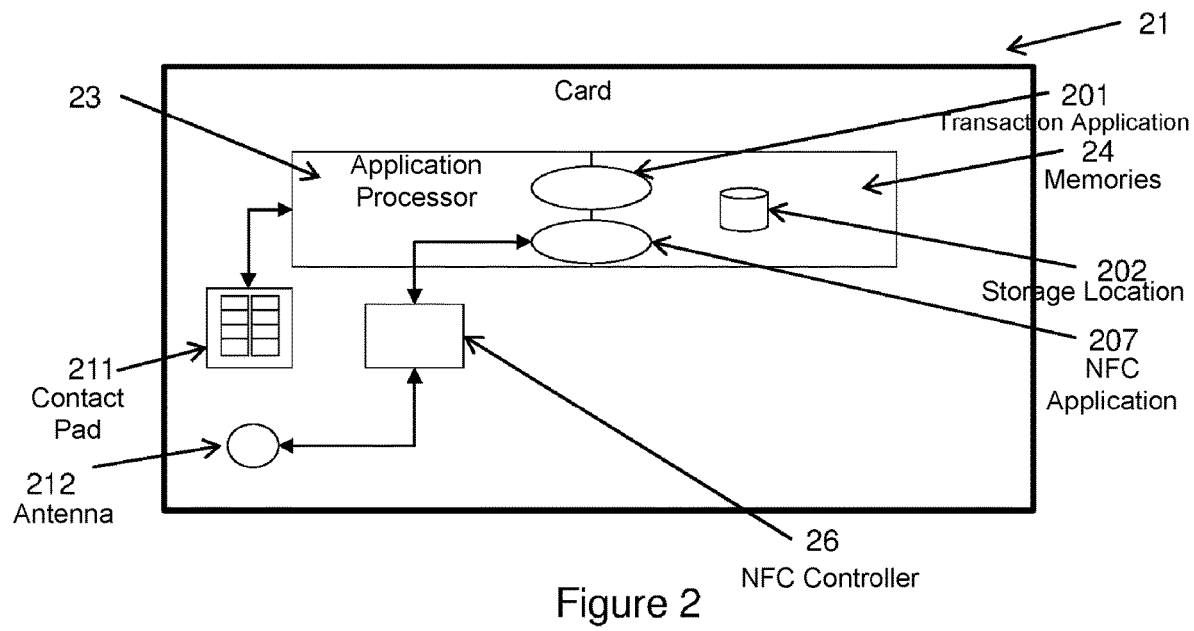
FIG. 2 shows schematically relevant parts of a representative hardware and
software architecture for an authentication device suitable for implementing embodiments of the disclosure.

FIG. 2 shows schematically relevant parts of a representative hardware and software architecture for an authentication device suitable for implementing an embodiment of the disclosure where the authentication device 2 is a chip card (particularly a chip card similar to an EMV payment card). The card 21 comprises an application processor 23, one or more memories 24 associated with the application processor and a NFC controller 26. The card 21 is equipped with a contact pad 211 for contact transactions using contact card protocols, such as ISO/IEC 7816, and also comprises an antenna 212 connected to NFC controller 26 to allow transactions under contactless card protocols, such as those defined under ISO/IEC 14443.

In the arrangement shown, the application processor 23 and associated memories 24 comprise (shown within the processor space, but with code and data stored within the memories) an (authentication) transaction application 201. The memories 24 may contain a storage location 202 for data associated with programs held by the card. The application processor 23 provides an NFC application 207 which interfaces with the NFC controller 26. In embodiments, the NFC application and associated NFC capabilities may be absent. In embodiments, the NFC application 207 may be absent and the functionalities of the NFC application 207 may be provided by the transaction application 201. An authentication transaction may be performed over a contact card interface, a contactless card interface, or any other communication channel available to the card for communicating with a terminal (either general purpose or dedicated to the purpose).

Figure 3:
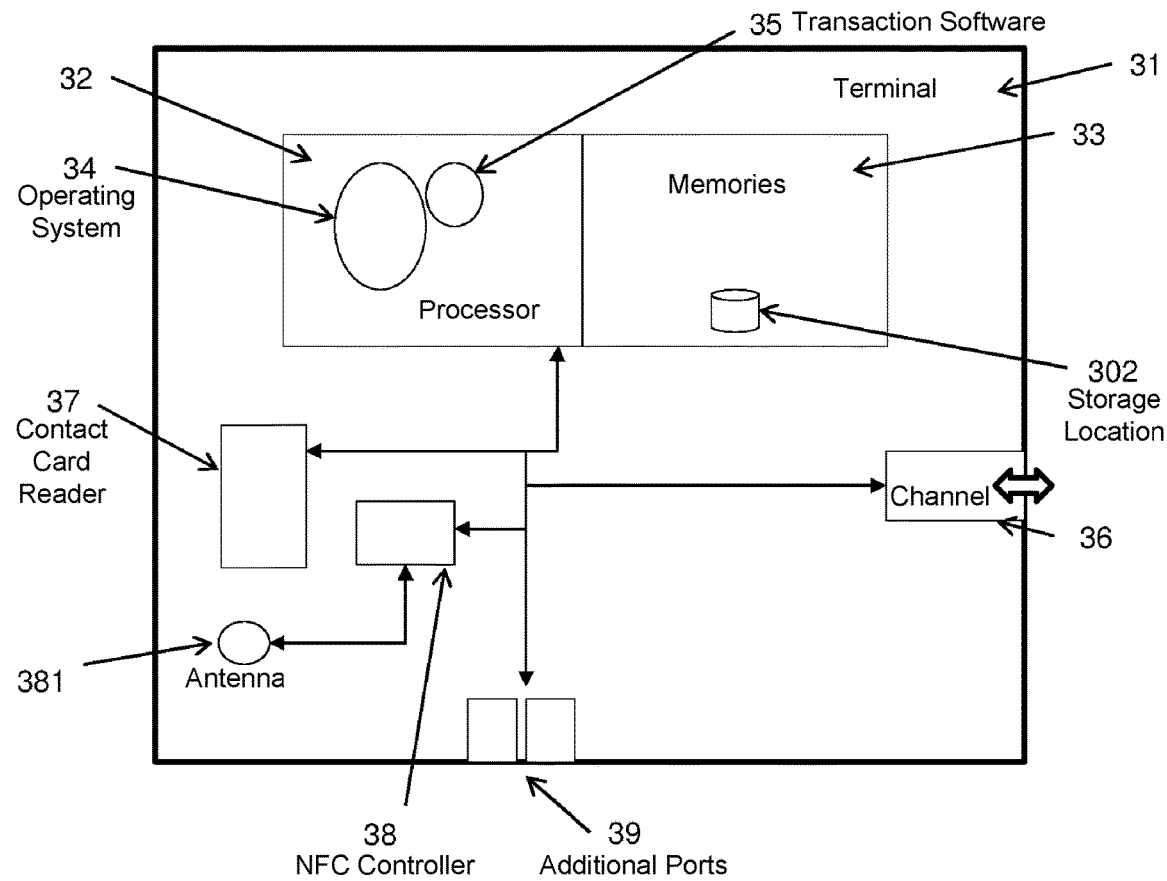
FIG. 3 illustrates the functional features of a terminal for use in embodiments of the disclosure in more detail.

FIG. 3 illustrates the functional features of a terminal 6 or 18 for use in embodiments of the disclosure in more detail. The terminal 31 has a processor 32 and associated memories 33. The base function of the terminal 31 in the case shown is to operate as a point of interaction (POI) with a financial system, such as a point of sale (POS) terminal. In the case shown, the terminal 31 has an operating system 34 and transaction software 35 (these may be provided together in a single assemblage of code, or may both be divided into a number of different components, but are represented here as two elements for convenience). The operating system 34 manages hardware resources and provides common services for applications, whereas the transaction software 35 performs the base function of the terminal 31 and may be provided (for example) as one or more applications. The terminal 31 will generally have a protected channel 36 to another party, such as a goods manager (this may, for example, be performed over a public network by use of encryption). The terminal 31 will also have means to make a connection to a device, such as an authentication device. In this case, the terminal 31 has a contact card reader 37 and an NFC controller 38 and antenna 381 to allow a contactless card connection to a contactless card, or a device, such as an NFC-enabled mobile telephone able to act as a proxy for a contactless card. The terminal 31 may have additional ports 39 to allow data to be provided to it from other sources (for example, by USB stick). The memories 33 contain a storage location 302 for a set of scripts to be transmitted to a payment card, and for transaction data that is sent periodically to a transaction infrastructure 14. Transactions may be established through the contact card reader 37 or through the NFC controller 38, or indeed any other appropriate local connection.

According to embodiments, the disclosure provides methods and systems to generate authenticated (i.e., signed) data allowing a goods manager to identify a product sold as authentic. Advantageously, embodiments of the disclosure re-use elements of the EMV transaction infrastructure to generate such signed information. In some embodiments, the signed information itself comprises product information.

Figure 4:
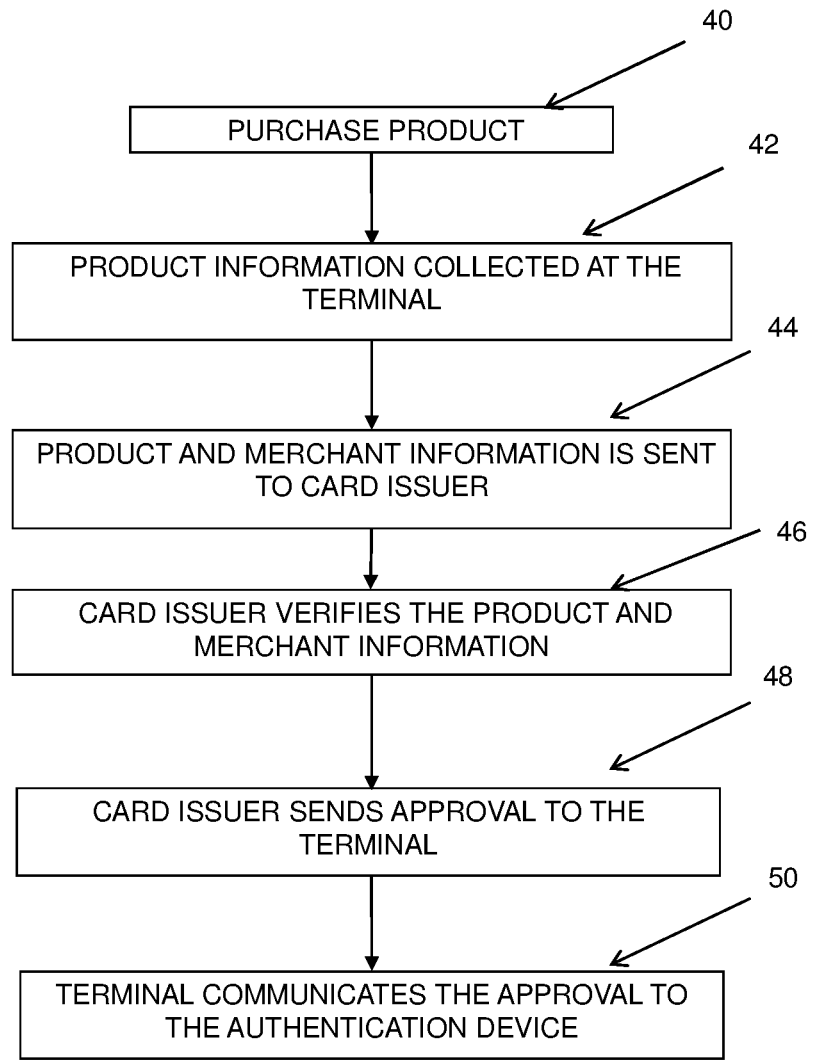
FIG. 4 shows, in flow diagram form, a method of authenticating goods at the point of sale, according to a general embodiment of the disclosure.

FIG. 4 shows in flow diagram form a method of authenticating goods at the point of sale, according to embodiments of the disclosure.

At step 40, a consumer purchases a product. Advantageously, the purchase transaction may be conducted with a payment card, thereby making transaction information available at the point of sale terminal 6. For example, the transaction software 35 at the point of sale terminal 6 may comprise a payment receiving application that may be able to export transaction information into an authentication application that may also be comprised in the transaction software 35. At step 42, the product information is collected at the terminal 6. In advantageous embodiments (see below), a connection is established between the authentication device 2 and the terminal 6, whereby the authentication device 2 is programmed to request product information. Product information may be collected by the merchant entering a product identifier, such as a serial number, and/or by scanning a barcode, QR code, NFC tag, or by optical recognition of product details on a photograph of the product, etc. As the person skilled in the art would understand, the manner in which the product details are communicated to the terminal has no impact on the performance of the methods describe herein, and will typically vary depending on the product, the input/output devices available at the terminal, etc.

At step 44, the product and merchant information is sent by the terminal 6 to the card issuer 12. This may be sent directly to the card issuer 12 via a normal or dedicated network, or via a conventional transaction infrastructure 14. In such cases, the information sent by the terminal 6 to the transaction infrastructure 14 contains enough information to route the information to the card issuer 12. In such scenarios, the card issuer 12 may interact with the transaction infrastructure 14 in a similar way as an issuer bank would in a conventional financial transaction infrastructure.

At step 46, the card issuer 12 verifies the product and merchant information, by querying the goods manager 16 if it is a separate entity, by requesting information from the one or more databases 16*a*. In particular, the card issuer 12 may request information as to whether the product information received is authentic (i.e., corresponds to a product that is managed by the goods manager 16), whether the instance of the product has already been registered, whether the merchant information corresponds to a location from which the product is expected to be sold, etc.

When the product and merchant information has been checked, the card issuer 12 sends 48 an approval to the terminal 6. In embodiments, the approval may contain an authorization code and information which can be used to authenticate the message. For example, the authorization code may be protected by a message authentication code (MAC). At step 50, the signed approval is then communicated to the authentication device 2. For example, when the authentication device 2 is a chip card, the information may be written on the chip by the terminal via a contact or contactless (e.g., RFID, NFC) interaction. The authenticated product and merchant information is stored on the authentication device 2.

Optionally, a consumer may be able to subsequently retrieve that information to check the authenticity of the goods associated with the authentication device 2. This may be performed via an application on a computing device that reads the information on the authentication device 2 and optionally interacts with the goods manager 16 (directly or indirectly, for example, via the card issuer 12) to verify the information. In embodiments where the information is signed by a trusted party (for example, as described above), the computing devices may not need to interact with the goods manager 16 to verify the information. Indeed, it may be sufficient for this purpose to verify that the signed information is authentic.

Advantageously, because the product information is associated with the authentication device 2 at the point of sale, this solution facilitates stock management of the authentication devices (both from a card issuer and from a merchant point of view) and reduces the cost of their manufacture (as they can all be essentially the same device, prior to being associated with a product).

Figure 5:
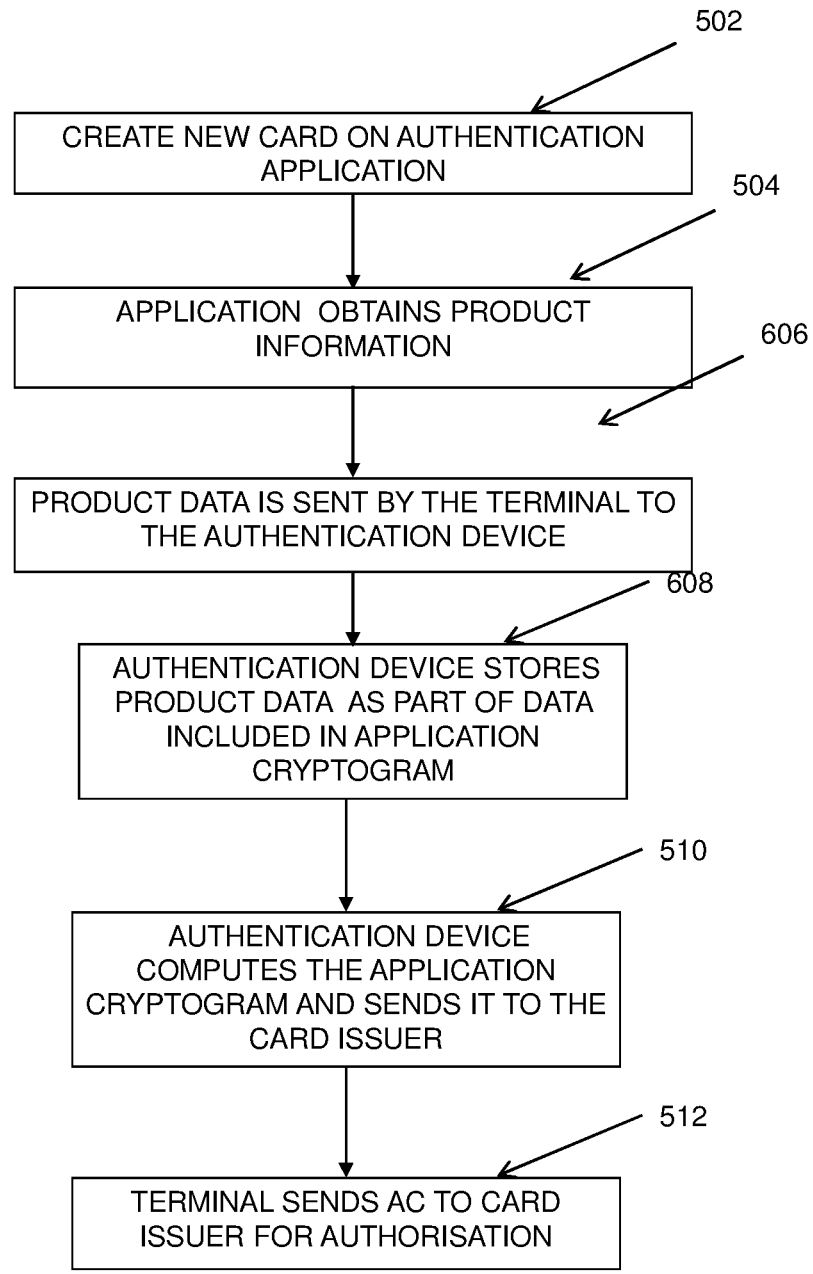
FIG. 5 shows in more detail a method of associating an authentication device to a product, according to embodiments of the disclosure.

FIG. 5 shows in more detail a method of associating an authentication device to a product, according to embodiments of the disclosure.

In this embodiment, the authentication device 2 comprises a chip that is a modified (contact and/or contactless) chip card as used for conventional financial transactions according to the EMV standard. For example, the authentication device 2 may be a modified M/Chip card, or a chip embedded in the product or its packaging, with a contactless M/Chip application, both provided by Mastercard®.

In a conventional EMV transaction (see e.g. EMV 4.3 Book 3 Application Specification), after a transaction has been initiated and an application selected, the card will provide to the terminal a data object called CDOL1 (Card Data Object List 1). This data object contains a list of tags that the card requires before making a decision on whether to approve or decline a transaction. In embodiments, the method does not require modification of the EMV kernel (i.e., the set of functions on the terminal that provide the necessary processing logic and data required to perform an EMV transaction, in combination with the terminal's payment application) used for conventional financial transactions. Advantageously, this means that minimal modification of the existing system for financial transactions, and in particular of the functionality of the point of interaction terminal, is required according to the disclosure. For example, the method may take advantage of existing data exchange mechanisms in contactless EMV kernels, for example, using the Mastercard® reader application MCL 3.0. The terminal will send back the information that the card has requested in the CDOL1 and request a cryptogram using the GENERATE AC (generate application cryptogram) command. In response, the card computes and returns an application cryptogram (AC). An application cryptogram consists of a message authentication code (MAC) generated over data, some of which is accessed internally by the card and some of which is referenced in the card's data object lists and transmitted from the terminal to the card. This is sent to the card issuer who checks the information contained and authorizes (or not) the transaction. In embodiments of the disclosure, this mechanism is advantageously re-used to associate product information with an authentication device.

At step 502, the authentication device 2, in this example a card/chip (i.e., a chip embedded in a product or its packaging, or a chip on a contact or contactless card, as described above), sends CDOL1 to the terminal 6, wherein the card/chip 2 has been modified so as to be programmed to contain an additional tag in CDOL1 requesting product information. At step 504, the terminal 6 requests input of the product data required by the card/chip 2. Once the product data has been entered as described above, it is sent 506 back to the card/chip 2. The card/chip 2 then stores 508 the product data as part of the data included in the application cryptogram. Advantageously, this solution allows to keep other data fields on the card/chip 2, such as the primary account number (PAN) for other purposes, for example, for routing to an issuer, and allows flexibility in terms of the size of product information data to be stored. Further, taking advantage of existing dynamic authentication mechanisms to carry product authentication information, for example, using a chip card application such as Mastercard's M/Chip, that is compatible with EMV standard allows to store more information than using the PAN (which is limited to 19 digits, at least some of which may be required for routing to the card issuer). For example, information may be stored in the issuer application data (IAD), "Amount", and "Amount, other" fields, which may all be used to compute the application cryptogram in conventional transactions (see below). In particularly, advantageous embodiments, the PAN may be used to identify the seller of the goods. This is useful because the PAN is conventionally used to route the transaction via a financial transaction infrastructure to an issuing bank, and the seller information could be used here similarly to route the authentication transaction to the card issuer 12 or goods manager 16 that is associated with the merchant or the products they sell.

The card/chip 2 then computes 510 the AC, and sends it to the terminal 6. The terminal 6 sends 512 the AC to the card issuer 12, directly or via the transaction infrastructure 14. The card issuer 12 then verifies (not shown) the information and sends the (signed) authorization code back to the card/chip 2 via the terminal 6, as described above.

Figure 6:
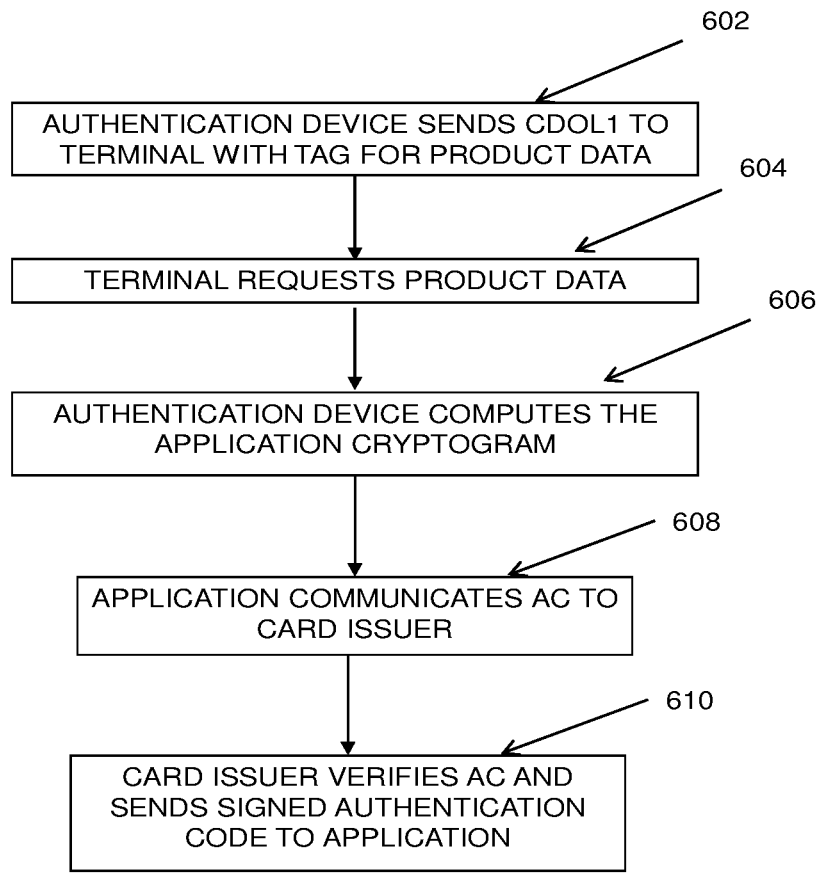
FIG. 6 shows in more detail a method of associating an authentication device to a product, according to other embodiments of the disclosure.

FIG. 6 shows in more detail a method of associating an authentication device 2 to a product, according to other embodiments of the disclosure. In these embodiments, no physical card/chip is provided. Instead, a virtual card is created in a dedicated application provided by the card issuer 12, and installed on a consumer's computing device, such as a modified payment application, for example Mastercard's Mastercard® Cloud-based Payment (MCBP) application. Therefore, in such embodiments, the authentication device 2 is a computing device which is programmed to execute an application hosting the virtual card. At step 600, the user creates a new virtual card. At step 602, the application requests the product information, which can be input into the application as discussed above in relation to the collection of product information by the terminal 6. At step 604, the application interacts with the terminal 6 to obtain additional information about the transaction, such as the identity of the seller, etc. At step 606, the application computes the AC based on this information, and communicates 608 it directly or via the merchant terminal 6, to the card issuer 12. The card issuer 12 then verifies 610 the information and sends the (signed) authorization code back to the application running on the consumer's computing device. Advantageously, this allows the product to be digitized into the application, which can then serve as a holding place for authentication and/or warranty information for multiple products, and can be regularly backed up.

Multiple options are possible for storing the authentication data (comprising product information and optionally information relating to the sale of the product) on the authentication device 2. Advantageously, the authentication data may be stored in data fields that are specified in EMV protocols, as such fields may already be present on a conventional transaction chip card. In embodiments some or all of the authentication data may be stored in the personal account number (PAN) data field of the authentication device 2. In embodiments, some or all of the authentication data may be stored in the EMV Issuer Application Data (IAD, tag 9F10). Advantageously, this data is included in the application cryptogram and the RSA signature used in conventional EMV transactions. In embodiments, some or all of the authentication data may be stored in a transaction data field that may already be present on conventional transaction chip cards, for example, the transaction amount, currency code, timestamp, etc. Advantageously, this data is included in the application cryptogram and the RSA signature used in conventional EMV transactions. In embodiments, some or all of the authentication data may be stored in one or more data fields sent by a terminal to a card in a conventional EMV transaction and used by the card to generate an application cryptogram. Such data fields may include any of (see EMV 4.3 Book 2, Section 8.1 Application Cryptogram Generation) the "Amount, Authorized", "Amount, Other", "Transaction Date", "Transaction Currency Code", "Transaction Type". In embodiments, a combination of data fields may be used, and/or different data fields may be used depending on the format of data to be stored (e.g., the length and type of the product information data to be stored). This allows to advantageously re-use data fields or combinations of data fields that are already defined in EMV standards and used for conventional transactions, while preserving flexibility in terms of the type and amount of data that is necessary to authenticate a product. In such embodiments, when the authentication device 2 is requested for the authenticated product information (see below), it may return the equivalent of a transaction record, comprising the authentication data. Additionally, such embodiments may advantageously ensure that the authentication device 2 no longer accepts transaction data (e.g., if the authentication device was misused as a payment device) once authentication data has been recorded in a transaction data field.

Advantageously, according to embodiments of the disclosure, the authenticated product information may be accessed by a consumer after the purchase. In embodiments in which the authentication device 2 is a card or chip, the chip may be read by a card reader (using contact or contactless processes, e.g., using an RFID reader). If the authentication device is NFC-enabled, the consumer may be able to download an application on a computing device equipped with an NFC reader. The application, when executed by the computing device, allows the computing device to extract and display the authenticated product information. If the authentication device 2 is a virtual card in a dedicated application executed by a computing device, such as a mobile phone, then the application can cause the mobile device to display the information directly, or to interact via wired or wireless connection to another device capable of displaying the information, including, e.g., a printer. The application could instead, or in addition, cause the computing device to produce a transcript containing the authenticated product information, and to send this to a given email address.

In embodiments, a transaction identifier may be generated based on the authentication data (which replaces some or all elements of the transaction data that would be present in a conventional transaction). Such an identifier may be used to reconcile signed information in the EMV protocol (for example, the application cryptogram generated above based on the product and card data) with information from another channel (e.g., detailed information about the product, merchant, purchase, etc., or any other information that would, for example, be provided to a consumer on a conventional warranty document). Advantageously, this allows a consumer to access detailed and verified information about their product in a readable format while conveying and authenticating product data through the EMV protocol in a way that is compatible with the existing EMV infrastructure. For example, a transaction identifier may be generated using the application cryptogram via a hash function, or other transaction specific elements. Examples of how suitable transaction identifiers may be generated are provided in document GB 2525191 A. For example, a transaction identifier may be generated by a digital enablement service that may be provided as part of a transaction infrastructure. The service may provide the identifier both to the authentication device 2 (or a computing device 5 equipped with a modified payment application, such as a digital wallet) and to the terminal. The identifier may be used by the authentication device 2 to obtain product information from a receipt service that may be provided by the goods manager 16 or the card issuer 12. The receipt service may provide additional information by the merchant terminal, such as, for example, the location, date and time of sale, etc.

While specific embodiments were described in detail above, the skilled person will appreciate that alternative embodiments may readily be devised that still fall within the scope of the claims. The scope of the disclosure is defined by the spirit and scope of the claims and is not limited by the embodiments described herein.

With that said, and as described, it should be appreciated that one or more aspects of the present disclosure transform a general-purpose computing device into a special-purpose computing device (or computer) when configured to perform the functions, methods, and/or processes described herein. In connection therewith, in various embodiments, computer-executable instructions (or code) may be stored in memory of such computing device for execution by a processor to cause the processor to perform one or more of the functions, methods, and/or processes described herein, such that the memory is a physical, tangible, and non-transitory computer readable storage media. Such instructions often improve the efficiencies and/or performance of the processor that is performing one or more of the various operations herein. It should be appreciated that the memory may include a variety of different memories, each implemented in one or more of the operations or processes described herein. What's more, a computing device as used herein may include a single computing device or multiple computing devices.

In addition, the terminology used herein is for the purpose of describing particular exemplary embodiments only and is not intended to be limiting. As used herein, the singular forms "a," "an," and "the" may be intended to include the plural forms as well, unless the context clearly indicates otherwise. And, again, the terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

It is also noted that none of the elements recited in the claims herein are intended to be a means-plus-function element within the meaning of 35 U.S.C. § 112(f) unless an element is expressly recited using the phrase "means for," or in the case of a method claim using the phrases "operation for" or "step for."

Again, the foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of authenticating products, the method comprising:
    receiving, by an authentication card, authentication data including information about a product and sale information associated with the product from a merchant terminal associated with a merchant during a sale of the product, wherein the authentication card is associated with a card issuer communicably connected to the merchant terminal and the authentication card is not associated with the product prior to the sale of the product;
    once the information about the product has been received, generating, by the authentication card, a signed message at the authentication card, the signed message comprising information about the authentication card and the authentication data as received from the merchant terminal;
    communicating, by the authentication card, the signed message to the card issuer;
    receiving, by the authentication card, authorization data authorizing the sale of the product from the card issuer when information in the signed message fulfils one or more criteria, wherein the authorization data received in the authentication card causes association of the authentication card with the product; and
    verifying authenticity of the product based on the authorization data by communicating the authorization data stored in the authentication card to a goods manager after the sale of the product.

2. The method of claim 1, wherein the authentication card is a modified payment card, chip or virtual card provided by an application executed on a computing device.

3. The method of claim 2, wherein the authentication card and the goods manager communicate via at least one element of a transaction infrastructure, and wherein the at least one element of the transaction infrastructure comprises the merchant terminal.

4. The method of claim 1, wherein the merchant terminal is a terminal of a payment system configured to process transactions according to the EMV specification.

5. The method of claim 4, wherein the signed information from the authentication card comprises an application cryptogram.

6. The method of claim 5, wherein the authentication card requests product information as part of the card data object list 1 (CDOL1).

7. The method of claim 1, wherein the authentication card is associated with a card issuer; and
    wherein receiving the authorization data from the goods manager includes receiving, by the authentication card, the authorization data from the goods manager via the card issuer in response to receipt, by the goods manager, of a query from the card issuer to verify the product information.

8. The method of claim 7, wherein the product information is stored on the authentication card in one or more data fields used to compute the application cryptogram in a conventional EMV payment device.

9. The method of claim 1, further comprising communicating, by the authentication card, the signed message to a card issuer, whereby the card issuer is permitted to use the information in the message to generate a unique transaction identifier.

10. The method of claim 9, wherein the transaction identifier comprises an output of a hash function, and wherein the input of the hash function comprises an application cryptogram generated by the authentication card.

11. The method of claim 1, wherein the authentication card is associated with a unique identifier which is comprised in the information of the signed message.

12. The method of claim 1, wherein providing a signed message which comprises information about the authentication card and information about the product received from the merchant terminal comprises providing the signed message to the merchant terminal.

13. The method of claim 1, further comprising storing, by the authentication card, information about the merchant in a personal account number data field.

14. The method of claim 1, wherein receiving by the authentication card the authorization data triggers a start of a warranty associated with the product.

15. An authentication card, comprising:
    a communication interface configured to communicate information for the authentication card with another device;
    a storage device for storing information on the authentication card; and
    a processor coupled to the communication interface and the storage device, the processor configured to:
        receive authentication data including information about a product and sale information associated with the product from a merchant terminal associated with a merchant during a sale of the product, wherein the authentication card is associated with a card issuer communicably connected to the merchant terminal and the authentication card is not associated with the product prior to the sale of the product;
        once the information about the product has been received, generate, by the authentication card, a signed message at the authentication card, the signed message comprising information about the authentication card and the authentication data as received from the merchant terminal;

communicate the signed message to the card issuer;

receive authorization data authorizing the sale of the product from the card issuer when information in the signed message fulfils one or more criteria, wherein the authorization data received in the authentication card causes association of the authentication card with the product; and verify authenticity of the product based on the authorization data by communicating the authorization data stored in the authentication card to a goods manager after the sale of the product.

16. The authentication card of claim 15, wherein the authentication card is a modified payment card or a chip card.

17. The authentication card of claim 15, wherein receiving by the processor the authorization data triggers a start of a warranty associated with the product.

18. A method of authenticating products, the method comprising:

obtaining, at a merchant terminal, authentication data during a sale of a product, the authentication data including the product information and sale information for the product;

communicating, by the merchant terminal, the authentication data to an authentication card, wherein the authentication card is not associated with the product prior to the sale of the product;

generating, by the authentication card, a cryptogram which comprises information about the authentication card and the authentication data as received from the merchant terminal;

sending, from the authentication card via the merchant terminal, the cryptogram to a card issuer associated with the merchant terminal;

receiving, by the authentication card via the merchant terminal, authorization data authorizing the sale of the product from the card issuer when information in the cryptogram fulfils one or more criteria, wherein the authorization data received in the authentication card causes association of the authentication card with the product;

storing, at the authentication card, the authentication data and the authorization data; and verifying authenticity of the product based on the authorization data by retrieving the authorization data from the authentication card and sending the authorization data to a goods manager.

19. The method of claim 18, wherein the authentication card is a modified payment card, chip or virtual card provided by an application executed on a computing device.

20. The method of claim 18, wherein receiving the authorization data triggers a start of a warranty associated with the product.

* * * * *